H. S. THOMAS, W. R. DAVIES AND R. B. THOMAS.
N. C. B. THOMAS, H. R. W. ANDERSON AND C. BATHURST, EXECUTORS OF R. B. THOMAS, DEC'D.
PLATE FEEDING APPARATUS.
APPLICATION FILED AUG. 6, 1917.
1,384,646.
Patented July 12, 1921.
3 SHEETS—SHEET 1.
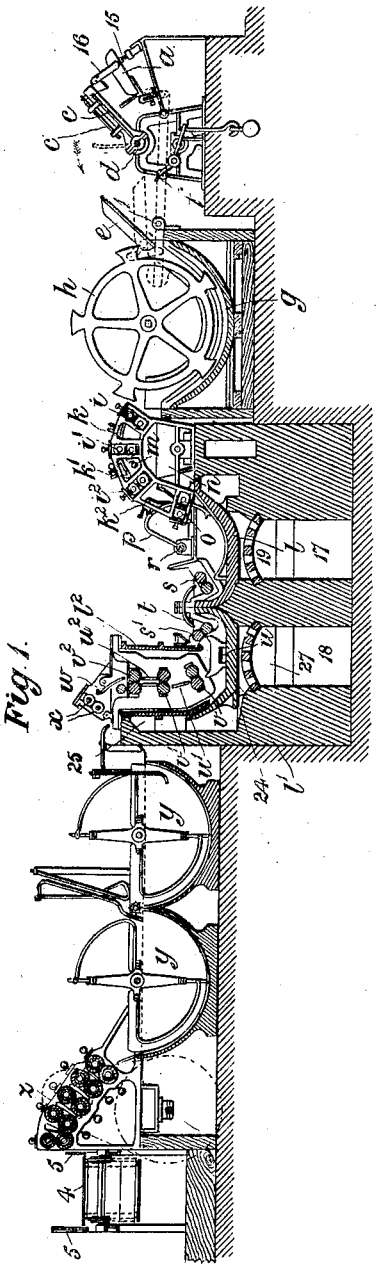
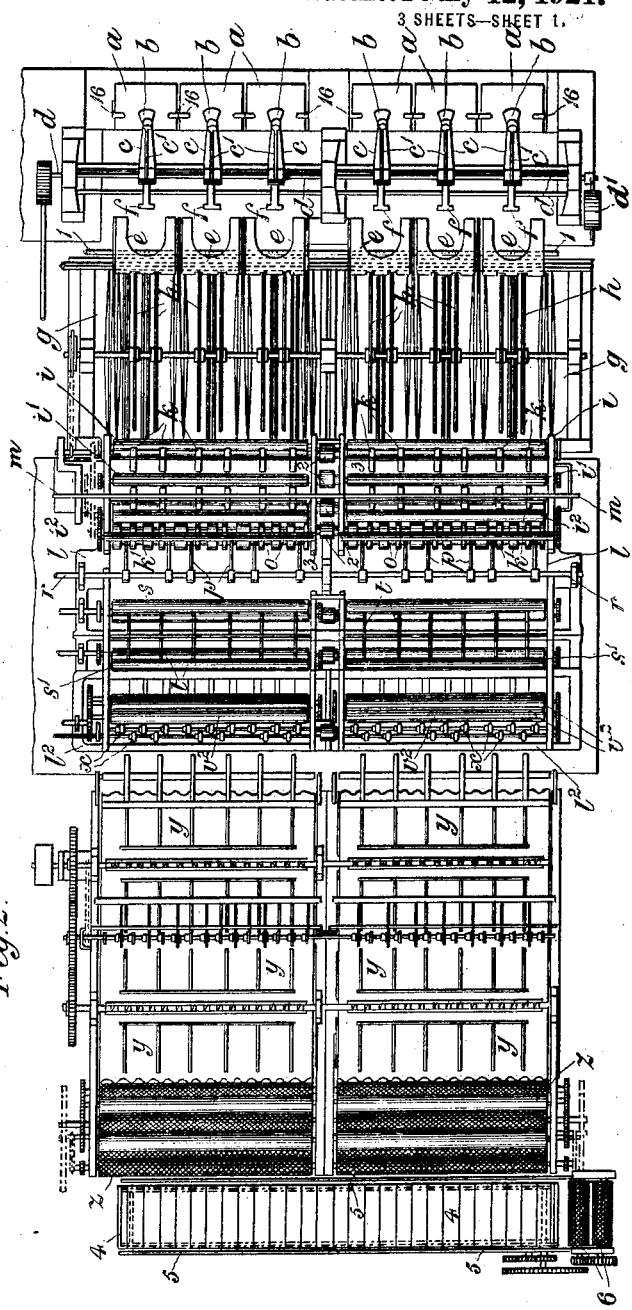

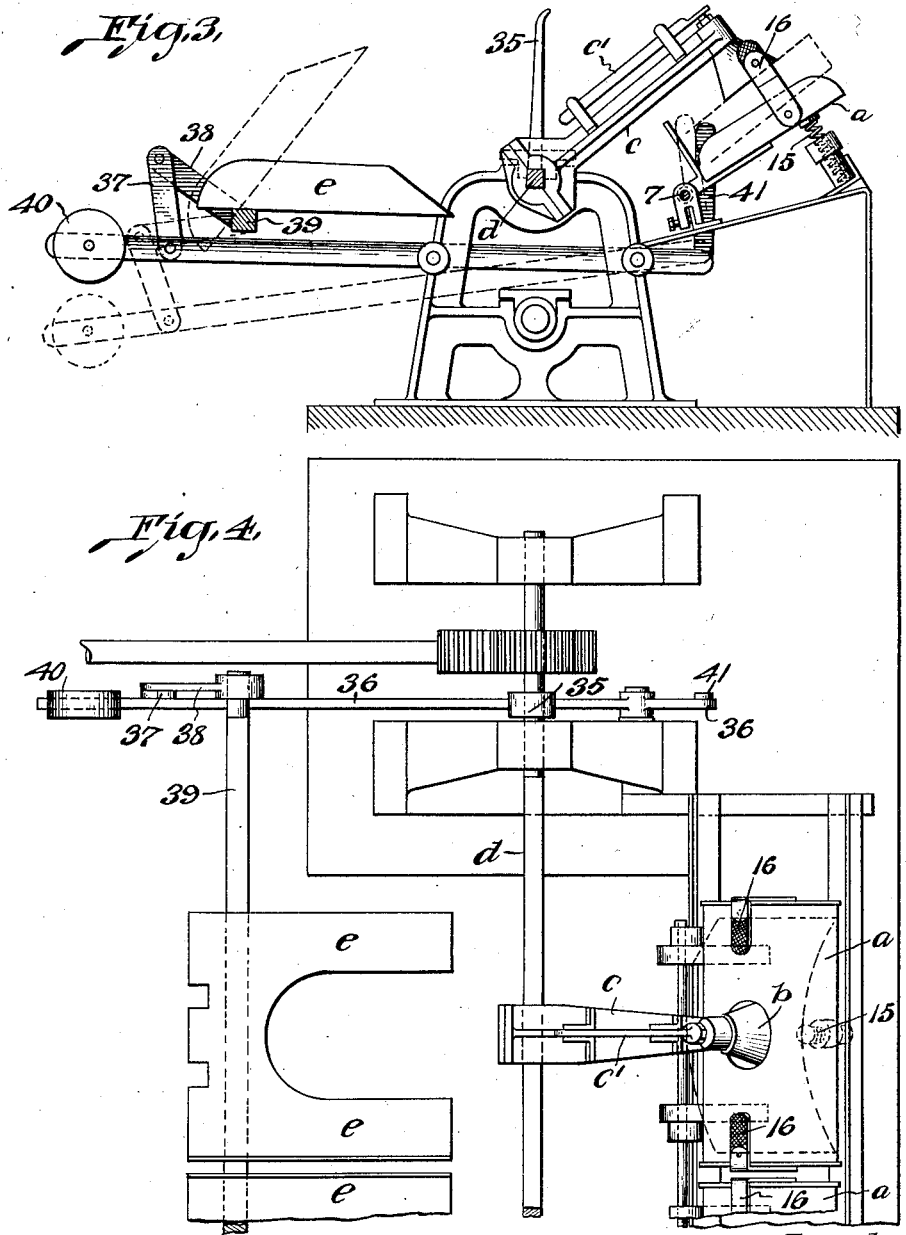

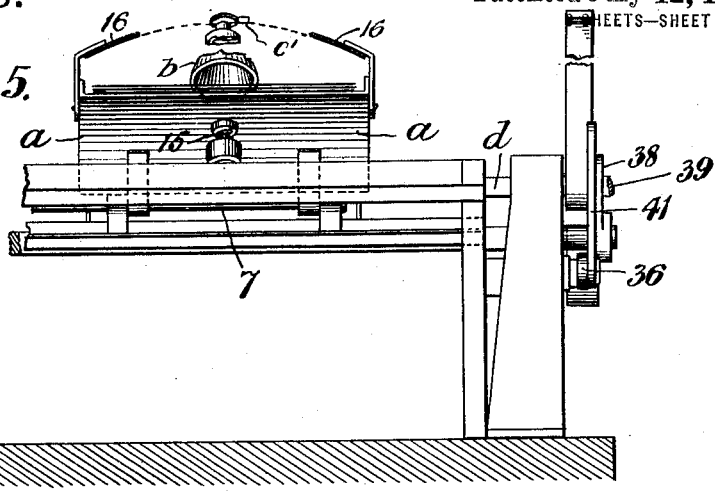

UNITED STATES PATENT OFFICE.

HUBERT SPENCE THOMAS, OF LLANDAFF, AND WILLIAM ROBERT DAVIES, OF WHITCHURCH, NEAR CARDIFF, WALES, AND RICHARD BEAUMONT THOMAS, DECEASED, LATE OF ENGLEFIELD GREEN, ENGLAND, BY NORA CONSTANCE BEAUMONT THOMAS, OF ENGLEFIELD GREEN, ENGLAND, HENRY ROBERT WILLIAM ANDERSON, OF LONDON, ENGLAND, AND CHARLES BATHURST, OF LYDNEY, ENGLAND, EXECUTORS OF SAID RICHARD BEAUMONT THOMAS.

PLATE-FEEDING APPARATUS.

1,384,646.  Specification of Letters Patent.  Patented July 12, 1921.

Application filed August 6, 1917. Serial No. 184,768.

*To all whom it may concern:*

Be it known that HUBERT SPENCE THOMAS, a subject of the King of Great Britain, residing at Llandaff, Glamorganshire, Wales, and WILLIAM ROBERT DAVIES, a subject of the King of Great Britain, residing at Whitchurch, near Cardiff, Glamorganshire, Wales, and RICHARD BEAUMONT THOMAS, deceased, formerly a subject of the King of Great Britain and lately residing at Englefield Green, Surrey, England, (NORA CONSTANCE BEAUMONT THOMAS, HENRY ROBERT WILLIAM ANDERSON, and Sir CHARLES BATHURST, subjects of the King of Great Britain, residing, respectively, at The Glade, Englefield Green, Surrey, England; No. 80 Redcliffe Gardens, London, England, and Lydney Park, Lydney, Gloucestershire, England, being the executors of RICHARD BEAUMONT THOMAS, deceased,) have invented certain new and useful Improvements in the Plate-Feeding Apparatus, of which the following is a specification.

Our invention consists of the new or improved machinery hereinafter described to be employed in the manufacture of tin-plates and sheets and other metal coated plates or sheets by the use of which new or improved machinery a series of single plates or sheets are simultaneously taken from a series of piles of plates or sheets arranged at the front end of the machine and are passed through the machine abreast, that is to say, in a row, the machine automatically effecting the pickling or chemical cleaning of the plates or sheets, the swilling of the same, the subsequent tinning or coating of the plates or sheets with metal, the after treatment or cleaning and dusting of the said tinned plates or sheets and the collecting of the same into a single pile ready to be packed or boxed for transit or storage, no hand labor being employed throughout the operations of the machine.

We will describe our new or improved machine in connection with the accompanying drawings.

Figures 1 and 2 represent in longitudinal section and plan respectively the complete continuous tinning machine constituting our invention, the said machine having a width proper to simultaneously receive for treatment six plates or sheets abreast, but we wish it to be understood that the machine may be constructed for receiving fewer or more than six plates or sheets at a time as may be desired.

Fig. 3 is a side elevation of the tables or supports for receiving the piles of plates or sheets and tilting tables to which the plates or sheets are transferred singly or one by one and plate feeding mechanism in connection therewith.

Fig. 4 is a plan of a side portion of the front end of the machine and Fig. 5 is a front elevation of the same.

Figs. 3 to 5 are drawn to a larger scale than Figs. 1 and 2.

The same letters of reference indicate the same parts in the several figures of the drawings.

At one end of the machine we arrange a series of spring supported tables for the reception of the piles of white annealed plates or sheets to be tinned. The preferred construction of the said spring supported tables $a$ is hereinafter particularly described with reference to Figs. 3, 4 and 5.

Near the said spring supported tables is a shaft $d$ which receives a rocking motion on which shaft is arranged a series of arms or levers $c$ each of which arms $c$ has on its free end an elastic cup or sucker feeding device $b$. Each of the sucker feeding devices $b$ on the motion of the arms $c$ in the direction of the arrow in Fig. 1, effected by the partial rotation of the rocking shaft $d$ in the forward direction, transfers a plate or sheet from one of the piles of plates or sheets on the tables $a$ on to one of the pivoted plate receiving tables $e$ when the latter are in the horizontal or nearly horizontal position indicated in dotted lines in Fig. 1. The plate receiving tables $e$ are gapped as will be best seen by an examination of Fig. 2, for the purpose of permitting the arms $c$ to pass therethrough and leave the plates or sheets carried over by the suckers $b$ on the tilting tables $e$. The plates or sheets are detached or released from the suckers $b$ when or immediately before they reach the tables $e$ by the action of the lever $c^1$ on the back of the arm $c$, which lever $c^1$ is brought into pressing contact with the weighted tappet lever $f$ below the receiving table $e$ the said lever $c^1$ being thereby made to open a valve in the suction cup $b$ and admit air thereto thus relieving the suction on the plate or sheet.

Slightly above the level to which the suckers $b$ are carried for the release of the plates or sheets is a water delivery pipe 1 (see Fig. 1) having jets positioned to direct streams of water into the cups $b$ and thereby wet the same prior to their backward motion for the purpose of again bringing them into pressing contact with the piles of plates or sheets at the front of the machine. If thought necessary or desirable a cock may be arranged at one end of the water delivery pipe 1 which can be turned on by an arm on the rocking shaft $d$ and turned off by a weighted lever on the plug of the cock the water being thereby caused to flow only when the cups $b$ are situated below the jets of the water delivery pipe 1.

A series of white annealed plates or sheets having been transferred to the receiving tables $e$ the said tables are tilted as represented in full lines in Fig. 1 and indicated in dotted lines in Fig. 3 and the plates or sheets slide from off the tilting tables $e$ into the pickling bath $g$ of the machine.

The tilting of the tables $e$ is hereinafter particularly described with reference to Figs. 3, 4 and 5.

The plates or sheets are carried through the pickling acid in the bath or trough $g$ by the usual snugs or hooklike projections on the peripheries of the wheels $h$ rotating in the said trough $g$.

From the said trough $g$ the plates or sheets are carried by the wheels $h$ into the first pair of guiding or transferring rolls $i$ and by the series of fixed or stationary guides $k$, $k^1$, $k^2$ and intermediate pairs of guiding and transferring rolls $i^1$, $i^2$ the plates or sheets are transferred to the tin-pot $l$.

The rolls $i$, $i^1$, $i^2$ as well as the other rolls hereinafter described are preferably made in two halves or parts the presented ends of which are connected together by couplings 2 situated between the middle housings 3, 3 of the rolls. The couplings 2 may be of any ordinary construction hence we do not think it necessary further to describe or represent the same.

During the passage of the plates or sheets between the pickling bath $g$ and the tin-pot $l$ the said plates or sheets are swilled by jets of water directed on to the upper and under surfaces of the same by perforated water delivery pipes $m$, $m$, the water running off the plates or sheets being mainly received in the trough $n$ situated under the rolls $i$, $i^1$, $i^2$.

The tin-pot $l$, soaking pot $l^1$ and grease pot $l^2$ required for the extra wide machine represented in Fig. 2 necessitates the use of correspondingly wide furnaces which are shown and hereinafter described generally.

Over the entrance end of the tin-plot $l$ is a pair of rolls $o$, $o$ running at a speed somewhat greater than the other rolls of the machine, the object of running the rolls $o$ at the said greater speed being to effect a quick passage of the plates or sheets received by the rolls $o$ through the flux on the surface of the molten tin in the tin-pot $l$ so as to get the said plates or sheets into the molten metal before they have had time to become unduly heated and dry as it is found that thereby a considerable economy in the consumption of tin is effected.

The plates or sheets after they have left the rolls $o$ are pushed through the molten tin in the tin-pot $l$ by the hook shaped or forked ends of the curved parts of arms $p$ on the rocking shaft $r$. The plates or sheets are transferred from the tin-pot $l$ to the soaking pot $l^1$ by the guide rolls $s$, stationary guides $t$ and guide rolls $s^1$. The plates or sheets are guided and carried through the soaking pot $l^1$ and grease pot $l^2$ by guides $u$, $u^1$, $u^2$ and pairs of rolls $v$, $v^1$, $v^2$ and are transferred by a top guide $w$ and additional pair of rolls $x$ to the branning machine $y$, and by the appliances of the branning machine, which differ in no essential respect from well known branning machines, to a set of cleaning or dusting rolls $z$.

The grease pot rolls are made in two halves or parts similar to the other rolls of the machine.

The cleaning or dusting rolls $z$ deliver the series of plates or sheets on to an endless traveling conveyer 4 having guards or fences 5 adjacent the edges of the same to prevent the plates or sheets from passing over the said edges. At that end of the conveyer 4 to which the plates or sheets are carried by the traveling motion of the same a second series of cleaning or dusting rolls 6 is preferably arranged by the action of which a polishing or cleaning of the plates or sheets in a direction at right angles to that effected by the cleaning or dusting rolls $z$ is obtained the plates or sheets being thereby more efficiently dusted or cleaned than is usual and further being collected into a single pile ready for transit, storage or other operation.

If thought necessary or desirable a still further cleaning or dusting of the plates or sheets may be effected by the employment of a third set of cleaning or dusting rolls arranged at right angles to that of the second set.

We will now describe the preferred construction of spring supports or tables for the piles of plates or sheets at the front of the machine.

Fig. 3 represents one of the said spring supports or tables in side elevation, Fig. 4 represents the same in plan and Fig. 5 in front elevation the said Figs. 3, 4 and 5 being drawn to a larger scale than Figs. 1 and 2.

The spring supported tables $a$ are hinged to spindles 7 and have arranged under and near the front edge a spring supported plunger or prop 15 which permits the table to yield and turn on the spindle 7 when pressure is applied to the pile of plates or sheets on the table $a$.

By this arrangement the bringing of the series of suckers $b$ into proper or active contact with the uppermost plates or sheets in the several piles is insured although the levels of the piles may vary considerably and a perfect regularity in the picking up of a complete series of plates or sheets is obtained.

From the sides of the tables $a$ arms 16, 16 project, the free ends of which overhang the sides of the piles of plates or sheets. The undersides of the arms 16 are covered with india rubber or leather. As soon as the uppermost plate or sheet of a pile is lifted and carried up by the motion of the sucker $b$ against the underside of the arms 16 the plate is caused to take a convex form as is indicated in dotted lines in Figs. 3 and 4 and the convexity increases until the side edges of the plate or sheet escape the free ends of the arms 16. By this action should more than one plate or sheet be picked up at a time by any one of the suckers through adhesion between the uppermost plate or sheet and the one next below in the pile the side edges of the plates will be separated to such an extent as to admit air between the contacting surfaces thereby destroying the suction or adhesion between the contacting plates the under plate falling into proper position on the pile of plates below.

The tilting of the plate receiving tables $e$ is effected as follows:—

On the shaft $d$ is a crank or arm 35 which when the sucker carrying arms $c$ move forward in the direction indicated by the arrow in Fig. 1 comes against a lever 36 the long arm of which is connected by a link 37 to an arm 38 on the shaft 39 to which the plate receiving tables $e$ are fixed and effects the movement of the parts into the positions indicated in dotted lines in Fig. 3 and the plates or sheets which have been transferred to the tables $e$ are thereby delivered into the pickling bath $g^1$. On the back motion of the sucker carrying arms $c$ and arm or crank 35 the tables $e$ automatically return to the normal position represented in full lines in Fig. 3, the weight of the said tables $e$ being sufficient to raise the counter balance weight 40 on the end of the lever 36.

If thought necessary or desirable a second crank or arm may be arranged to project from the same boss as the crank or arm 35 to act as a tappet on the end of the projecting upright or bar 41 on the short arm of the lever 36 at or nearly at the end of the backward motion of the arms $c$ should from any cause the tables $e$ remain in their tilted position.

In the furnace structure shown generally, 17 is the tin-pot furnace extending from one end of the same to near the middle, and 18 is a similar furnace under the soaking pot $l^1$. Each furnace or chamber 17, 18 has an open-work arched roof of brick work.

The flue 19 in line with the chamber 17 extends under the whole of that part of the tin-pot not situated immediately over the chamber 17. The products of combustion or furnace gases gain access directly to the underside of the tin-pot $l$, through the perforations in the arched roof of the chamber 17 and flue 19.

To efficiently heat the soaking pot $l^1$ and grease pot $l^2$ the heated air and products of combustion passing through the open work of the arched roof of the chamber 18 and flue 27 in line therewith partially escape from the said chamber 18 and flue 27 through side openings 24 (see Fig. 1) into a longitudinal flue 25 one side of which is formed by one of the vertical sides of the grease pot.

We claim:—

1. In a tinning machine or apparatus, a series of yieldable cup-like suckers carried by arms on a rocking shaft, in combination with a series of pivoted yieldingly supported tables to contain piles of plates, said suckers being capable of accommodating themselves to the varying heights and inclinations of the surfaces of the uppermost plates in the respective piles.

2. In a tinning machine or apparatus, the combination of means for picking-up plates, a tilting table to which a single plate or sheet is transferred by said plate picking-up device, and means operative by the plate picking-up device for tilting the table to detach the plate or sheet from the picking-up device.

In testimony whereof we have hereunto set our hands.

HUBERT SPENCE THOMAS.
WILLIAM ROBERT DAVIES.

NORA CONSTANCE BEAUMONT THOMAS,
HENRY ROBERT WILLIAM ANDERSON,
CHARLES BATHURST,

*Executors of Richard Beaumont Thomas, deceased.*